(No Model.)

G. ADAMS.
FLAXSEED SEPARATOR.

No. 320,831. Patented June 23, 1885.

WITNESSES:
Chas. Nida
C. Sedgwick

INVENTOR:
G. Adams
BY Munn & Co.
ATTORNEYS.

UNITED STATES PATENT OFFICE.

GEORGE ADAMS, OF SHERBURNE, MINNESOTA.

FLAXSEED-SEPARATOR.

SPECIFICATION forming part of Letters Patent No. 320,831, dated June 23, 1885.

Application filed March 27, 1885. (No model.)

*To all whom it may concern:*

Be it known that I, GEORGE ADAMS, of Sherburne, in the county of Martin and State of Minnesota, have invented a new and useful Improvement in Flaxseed-Separators, of which the following is a full, clear, and exact description.

Reference is to be had to the accompanying drawings, forming a part of this specification, in which similar letters of reference indicate corresponding parts in all the figures.

Figure 1:
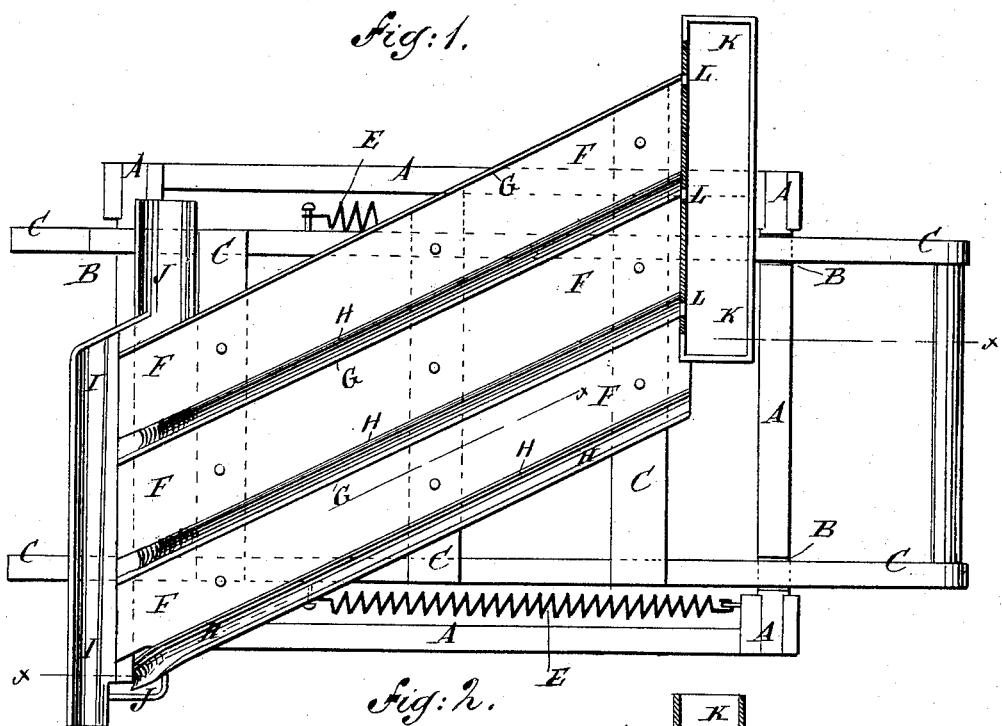
Figure 2:
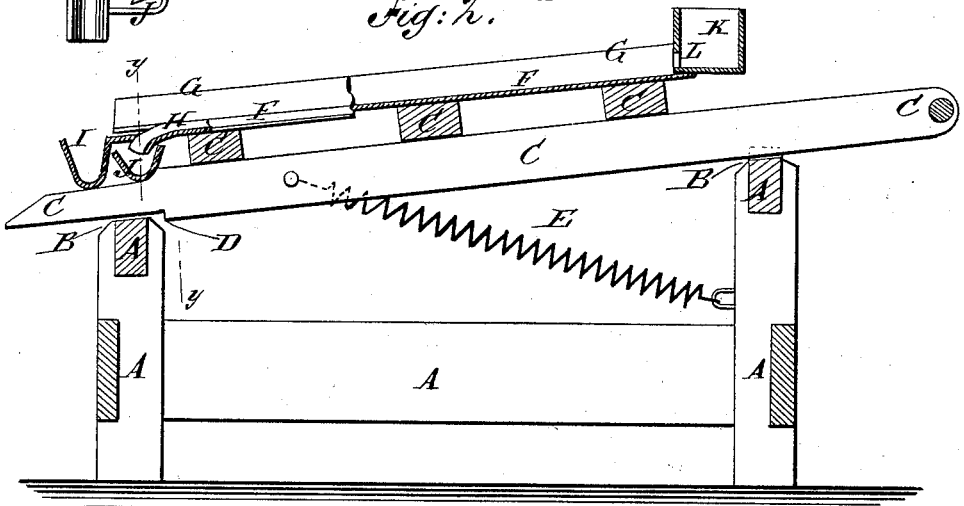
Figure 3:
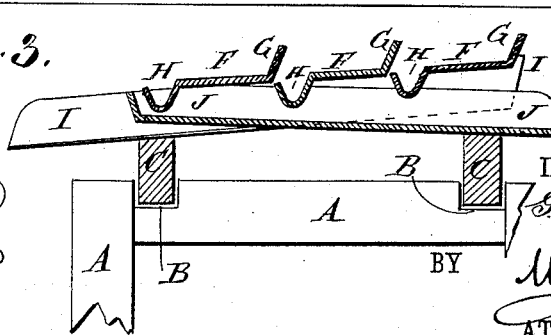

Figure 1 is a plan view of one of my improved flaxseed-separators. Fig. 2 is a sectional side elevation of the same, taken through the broken line $x\ x\ x$, Fig. 1. Fig. 3 is a sectional end elevation of the same, taken through the broken line $y\ y$, Fig. 2.

The object of this invention is to provide simple, convenient, and effective machines for separating mustard-seed and other round seeds from flaxseed.

The invention relates to a seed-separator constructed with a frame having ends of unequal heights and provided with guide-recesses in its top cross-bars, a frame sliding in the said recesses having shoulders to strike against a top bar of the main frame, and a series of parallel plates attached to the said sliding frame and having flanges along the upper side edges, grooves along the lower side edges, discharge-spouts connected with one end, and a feed-box connected with the other end, whereby round seeds can be readily separated from flaxseed.

The sliding frame carrying the separating-plates, discharge-spouts, and feed-box is connected with the stationary main frame by springs to give steadiness to the movements of the said sliding frame, as will be hereinafter fully described, and then claimed.

A is the frame of the machine, which can be made of any convenient length, breadth, and height, and which is made with one end higher than the other, as shown in Fig. 2.

The top end cross-bars of the frame A have grooves or recesses B formed in them to receive the side bars of the frame C, which rests and slides in the said recesses.

Upon the lower sides of the side bars of the frame C are formed shoulders D to strike against the lower top cross-bar of the frame A and jar the said frame C when it comes to the end of its forward movement. The frame C is steadied after each forward movement by spiral or other springs E, attached to the said frame C and to the frame A.

To the cross-bars of the sliding frame C are attached a series of parallel sheet-iron plates, F, one edge of each of which is bent upward to form a flange, G, and along its other edge is formed a groove, H. The plates F are slightly inclined laterally toward their grooved side edges, as shown in Fig. 3.

With the lower ends of the bodies of the plates F is connected a spout, I, inclining downward toward one side of the machine, and with the lower ends of the grooves H is connected a spout, J, inclining downward toward the other side of the machine, as shown in Fig. 3.

To the upper ends of the plates F is attached a box, K, in the side of which opposite each plate F is formed an opening, L, through which openings the seeds can escape from the said box to the said plates F. The plates F are set at an angle with the length of the frame C, and the spouts I J and box L are set at right angles, or nearly so, with the length of the said frame, as shown in Fig. 1.

In using the separator the flaxseed to be cleaned is placed in the box K, and the frame C is vibrated by hand or by a suitable mechanism, causing the contents of the said box K to pass through the openings L to the plates F. The vibration of the frame C and the jar accompanying each forward movement of the said frame causes the flat flaxseed to slide up the inclined plates against the flanges G, and then to move downward to pass out of the machine through the spout I, while the mustard-seed and other round seeds roll down the plates F into the grooves H and pass down the grooves H into the spout J, through which they pass out of the machine.

The reason that the flat flaxseed slide up the inclined plates F is that the jar caused by the shoulders D striking the cross-bar A will throw said seed in a forward direction, and as the flanges incline in a direction to cross, as it were, the path of the forwardly-sliding seed, said seed will be guided thereby to the spout I. Round seed would of course roll down into one of the grooves H; but flat seed will be kept against the flanges G, and will be forced forward at every jar until they leave the plates F.

Having thus described my invention, I claim as new and desire to secure by Letters Patent—

1. In a seed-separator, the combination, with the frame A, having ends of unequal height and provided with guide-recesses B in its top cross-bars, of the sliding frame C, having shoulders D, and the parallel plates F, having flanges G along their upper side edges and grooves H along their lower side edges, the discharge-spouts I J, connected with the lower ends of the plates F and grooves H, and the feed-box K, provided with discharge-openings L, substantially as herein shown and described, whereby round seeds can be readily separated from flaxseed, as set forth.

2. In a seed-separator, the combination, with the stationary frame A and the sliding frame C, carrying the flanged and grooved plates F, the discharge-spouts I J, and the feed-box K, of the springs E, substantially as herein shown and described, whereby steadiness is given to the movements of the said frame, as set forth.

GEORGE ADAMS.

Witnesses:
OLE LEE,
G. M. SCOTT.